US008566098B2

(12) United States Patent
Syrdal et al.

(10) Patent No.: US 8,566,098 B2
(45) Date of Patent: Oct. 22, 2013

(54) SYSTEM AND METHOD FOR IMPROVING SYNTHESIZED SPEECH INTERACTIONS OF A SPOKEN DIALOG SYSTEM

(75) Inventors: Ann K Syrdal, Morristown, NJ (US); Mark Beutnagel, Mendham, NJ (US); Alistair D Conkie, Morristown, NJ (US); Yeon-Jun Kim, Whippany, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1484 days.

(21) Appl. No.: 11/929,542

(22) Filed: Oct. 30, 2007

(65) Prior Publication Data

US 2009/0112596 A1 Apr. 30, 2009

(51) Int. Cl.
*G10L 15/18* (2013.01)

(52) U.S. Cl.
USPC ............... 704/257; 704/9; 704/258; 704/260; 704/231

(58) Field of Classification Search
USPC .............................. 704/9, 257, 258, 260, 231
See application file for complete search history.

(56) References Cited

U.S. PATENT DOCUMENTS

| | | | | |
|---|---|---|---|---|
| 5,381,514 | A * | 1/1995 | Aso et al. | 704/264 |
| 5,577,165 | A * | 11/1996 | Takebayashi et al. | 704/275 |
| 7,440,898 | B1 * | 10/2008 | Eberle et al. | 704/270.1 |
| 7,742,911 | B2 * | 6/2010 | Chotimongkol et al. | 704/4 |
| 2004/0049375 | A1 * | 3/2004 | Brittan et al. | 704/9 |
| 2006/0080101 | A1 * | 4/2006 | Chotimongkol et al. | 704/257 |

* cited by examiner

*Primary Examiner* — Qi Han

(57) ABSTRACT

A system and method are disclosed for synthesizing speech based on a selected speech act. A method includes modifying synthesized speech of a spoken dialogue system, by (1) receiving a user utterance, (2) analyzing the user utterance to determine an appropriate speech act, and (3) generating a response of a type associated with the appropriate speech act, wherein in linguistic variables in the response are selected, based on the appropriate speech act.

12 Claims, 4 Drawing Sheets

SYSTEM AND METHOD FOR IMPROVING SYNTHESIZED SPEECH INTERACTIONS OF A SPOKEN DIALOG SYSTEM

BACKGROUND OF THE INVENTION

1. Field of the Invention

This invention relates generally to spoken dialogue systems and more specifically to improving the synthetic speech generated by spoken dialogue systems.

2. Introduction

Currently, spoken dialogue systems have become much more popular with entities that use the systems in place of humans or where human operators are impractical. Such spoken dialog systems need to interact with humans in a sufficiently natural way that their use will be acceptable. The systems will formulate responses to user input by choosing appropriate words and creating sentences out of words. Once the text of a response is determined, a synthesizer such as a text-to-speech synthesizer will generate the audible response. The response and its particular characteristics, however, are not always appropriate. As these systems continue to replace humans, they need to create a more natural dialogue that is both effective and appropriate. Inappropriate interactions are caused by the system using the same synthetic voice without regard to the situation. Humans typically change linguistic characteristics while speaking depending on the type of speech as well as the form of dialogue. Some systems have implemented the ability to use a faux emotion in the synthesized voice; however, once again, this often leads to inappropriate simplification of the common human dialogue. Therefore, what is currently needed is a system that can improve the synthetic voices of spoken dialogue systems in order to create a more natural dialogue.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods and computer-readable media for modifying linguistic variables in synthetic speech based on a speech act associated with the utterance. A method embodiment includes modifying synthesized speech of a spoken dialogue system, by (1) receiving a user utterance, (2) analyzing the user utterance to determine an appropriate speech act, and (3) generating a response of a type associated with the appropriate speech act, wherein in linguistic variables in the response are selected, based on the appropriate speech act. In this regard, features of the response such as prosody and pitch may be selected according to a speech act of the response. Thus, if the response is a questions, yes/no answer, or any kind of particular speech act, the variables are selected consistent with how the characteristics of how a person would articulate a response of that kind.

The principles of this system may better utilize a spoken dialogue system generating an automated response that better reflects natural human dialogue. The principles of the system may also be used to change linguistic variables within the speech acts of the synthetic dialogue to generate a response that is better suited for human interaction.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
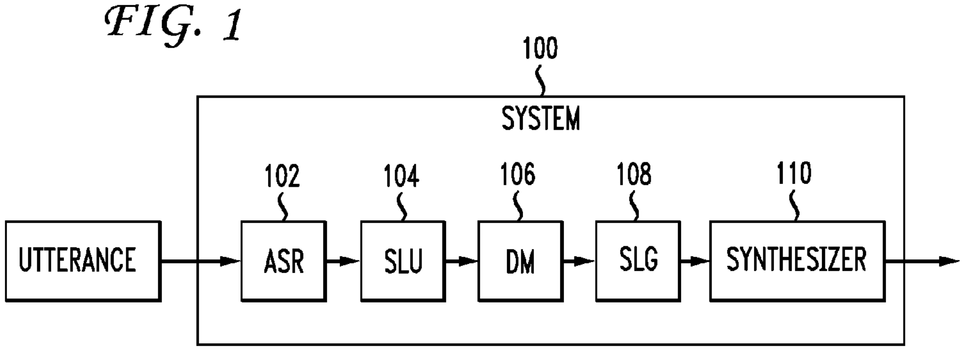
FIG. 1 illustrates an example system embodiment.

Spoken dialog systems aim to identify intents of humans, expressed in natural language, and take actions accordingly, to satisfy their requests. FIG. 1 is a functional block diagram of an exemplary natural language spoken dialog system 100. Natural language spoken dialog system 100 may include an automatic speech recognition (ASR) module 102, a spoken language understanding (SLU) module 104, a dialog management (DM) module 106, a spoken language generation (SLG) module 108, and a synthesizer module 110. The synthesizer module may be any type of speech output module. For example, it may be a module wherein one of a plurality of prerecorded speech segments is selected and played to a user. Thus, the synthesizer module represents any type of speech output. The present invention focuses on innovations related to the dialog management module 106 and may also relate to other components of the dialog system.

ASR module 102 may analyze speech input and may provide a transcription of the speech input as output. SLU module 104 may receive the transcribed input and may use a natural language understanding model to analyze the group of words that are included in the transcribed input to derive a meaning from the input. The role of DM module 106 is to interact in a natural way and help the user to achieve the task that the system is designed to support. DM module 106 may receive the meaning of the speech input from SLU module 104 and may determine an action, such as, for example, providing a response, based on the input. SLG module 108 may generate a transcription of one or more words in response to the action provided by DM 106. Synthesizer module 110 may receive the transcription as input and may provide generated audible speech as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, may generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having a phone capability) may have an ASR module wherein a user may say "call mom" and the smartphone may act on the instruction without a "spoken dialog."

Figure 2:
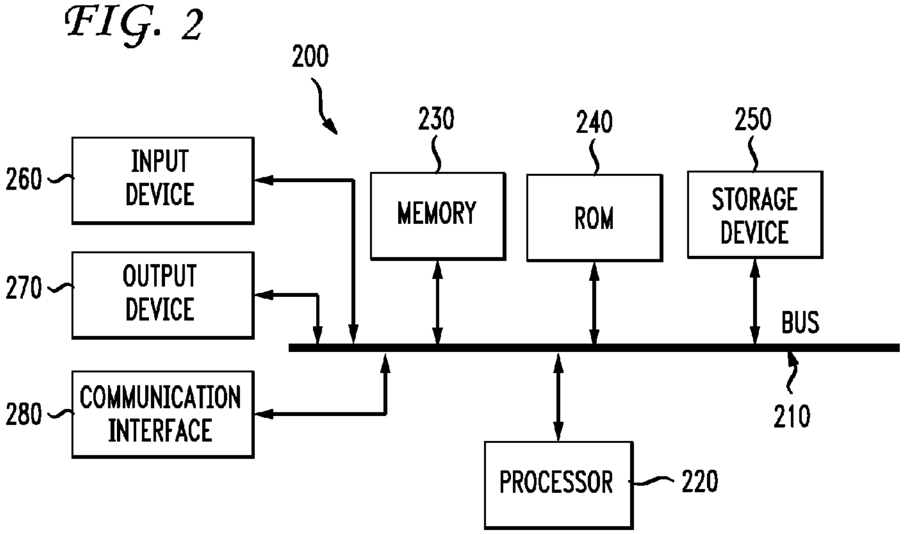
FIG. 2 illustrates a basic system or computing device embodiment of the invention.

FIG. 2 illustrates an exemplary processing system 200 in which one or more of the modules of system 100 may be implemented. Thus, system 100 may include at least one processing system, such as, for example, exemplary processing system 200. System 200 may include a bus 210, a processor 220, a memory 230, a read only memory (ROM) 240, a storage device 250, an input device 260, an output device 270, and a communication interface 280. Bus 210 may permit communication among the components of system 200. It is further disclosed that the synthesizer may utilize text to speech technology (TTS) in order to generate the synthetic voice. Where the inventions disclosed herein relate to the TTS voice, the output device may include a speaker that generates the audible sound representing the computer-synthesized speech.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to system 200, such as a keyboard, a mouse, a pen, motion input, a voice recognition device, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables system 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of natural spoken dialog system 100, communication interface 280 may not be included in processing system 200 when natural spoken dialog system 100 is implemented completely within a single processing system 200.

System 200 may perform such functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Initially, a speech act is the use of language to perform an act. The system can be configured to use the modules described above to discern when a speech act needs to be generated and to use the appropriate phonemes when synthesizing speech for that speech act. One embodiment that generates the appropriate speech act is configured to utilize the DM module 106 to discern between different speech acts that are appropriate in certain dialogue situations. This is why, in one embodiment of the system 100, the DM module 106 plays a role in the determination when to utilize the correct phonemes for a response representing a speech act. This embodiment of the system uses the DM 106 to determine when to include the correct phonemes in the synthesized speech. Other embodiments make use of the DM, SLU, synthesizer, and other modules to synthesize appropriate speech acts for a dialogue.

Referring to FIG. 1, in one embodiment, the system receives a user utterance and processes it through the ASR 102. The signal from the ASR is communicated to the SLU 104 to understand the meaning in the utterance received by the system 100. The signal, once understood, is communicated to the DM module 106 to determine if a particular speech act should be associated with a response to carry on the dialogue. If a speech act is necessary then the signal sent from the DM module 106 to the SLG module 108 will contain instructions to use the phonemes associated with the appropriate speech act. The synthesizer module 110 then produces speech with the phonemes from a prompt or phoneme database with labels associated with the data that enable the selection of data appropriate for that speech act. The system 100 may also determine whether the user's utterance is associated with a particular speech act. This may be done by an analysis of the text and audible characteristics of the input. For example, if prosody and pitch detected in the input speech indicate a directive or request, knowing or classifying the input with a speech act may further provide important information to other models in the dialog system to aid in not only generating a response but a response associated with a response speech act with the appropriate prosody, pitch, etc.

Speech acts can take many forms within a typical dialogue. Some non-limiting examples include informative-detail (this is typically low predictability dense information such as names, addresses, numbers, alpha-digits), informative-general (such as declarative sentences with less dense content), "wh" questions, yes/no questions, multiple choice questions, greetings, goodbye, apology, thanks, request, directive, repeat, wait, confirmation, disconfirmation, positive exclamation, negative exclamation, warning cue phrase, exclamation-positive (e.g., "Great!"), exclamation-negative (e.g., "Darn!", "so," "well . . . ") filled phrase, and filled pause (e.g., "hmmmm"). Other speech acts may be identified and used. Each speech act contains its own respective phonemic differences that the system 100 can identify, generate and/or use. For example, a phoneme database may contain various phoneme tags used or associated with a particular speech act. These may be selected when speech is synthesized. For example, one of the phonemic differences of a speech act maybe that an informative detailed utterance has a slower speech rate than a general information utterance. In another example, the system 100 may increase the pitch range of words used in a greeting versus those same words used in the context of normal dialogue. There are many speech acts, and each contains its own linguistic variables that the system 100 may exploit. The linguistic variables that may be adjusted include but are not limited to verbiage, vocabulary, pronunciation, phrasing, pauses, and prosody.

Speech identified from user input or to be synthesized by the system may have one label associated with a speech act for the utterance or may have more than one label. For example, a synthesized response may include a label of an apology and a thanks. In this regards, the system may further modify the audible characteristics of the response to perhaps blend the prosody, pitch, etc. of two or more different speech acts. There may be further weighting that occurs as well. For example, if a large portion of a response is an apology with a small portion being associated with a thanks speech act, then the prosody, pitch etc. may be weighted more for an apology speech act with a smaller portion of the characteristics associated with a thanks speech act. Or they system may generate the portion associated with the apology at 100% characteristics of the apology speech act and the thanks portion with 100% characteristics of the thanks speech act. These may also be adjusted based on dialect, an identified culture of the user, or other data.

One of the many linguistic variables that the system 100 can alter is the prosody of the speech. The prosody of the speech can describe tone, intonation, rhythm, focus, syllable length, loudness, pitch, format, or lexical stress. A non-comprehensive list of further linguistic variables is speed, vocabulary, pronunciation, phrasing, and pauses. The system 100 can recognize at least these linguistic variables and alter them as necessary to synthesize speech consistent with an appropriate speech act.

Figure 3:
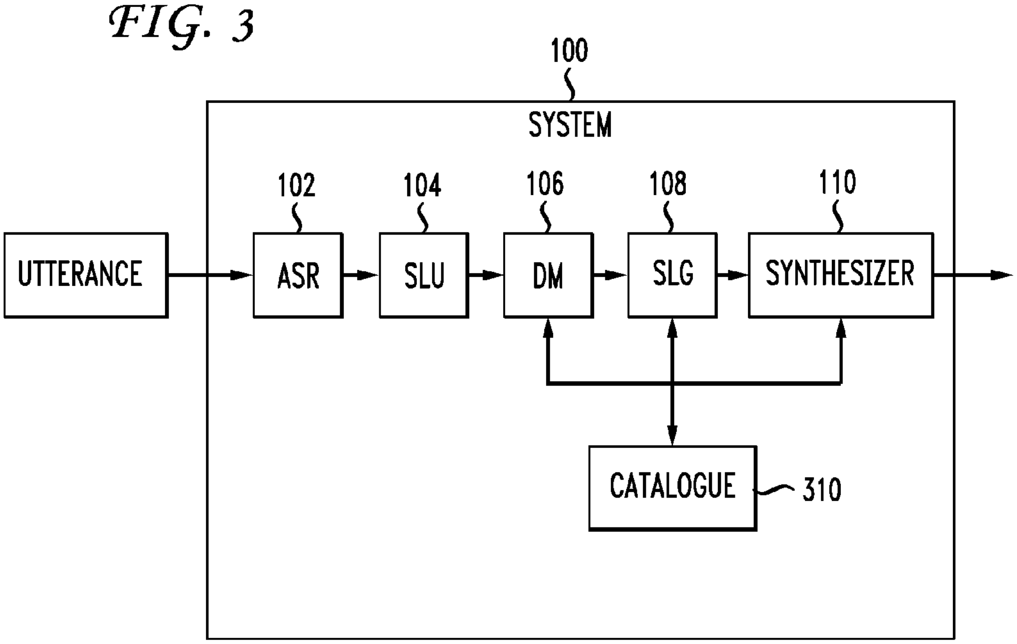
FIG. 3 illustrates a basic example system embodiment that has access to a catalogue.

In one embodiment of the system, as shown in FIG. 3, the SLG module 108 has access to a catalogue 310 containing phonemes that are tagged in categories associated with the specific speech acts. This is exemplified by the system 100 receiving an utterance from the user indicating that his or her problem is solved and that the user no longer needs the system 100. The DM module 106 recognizes this as the end of the conversation and communicates the appropriately tagged category regarding the necessary speech act to the SLG module 108. The SLG module 108 generates the text of the response consistent with necessary speech act, based on the tagged category, and communicates it to the synthesizer module 110. The synthesizer module 110 then generates the speech acts of "thanks" and "goodbye" using phonemes consistent with the speech act. The synthesizer module 110, recognizes the category tags in the communicated text, this enables the synthesizer module 110 to generate an appropriate response with the proper linguistic characteristics. As can be seen, in this approach, different phoneme or recorded voice may be used even on the same words. For example, synthesizing the words "thank you" may be audibly different if the "thank you" is part of an apology speech act as apposed to a general information speech act.

The previous example is accomplished by the DM module 106 tagging the appropriate category for the speech act and communicating that category to the SLG module 108. The SLG module 108 then chooses the phonemes from the catalogue 310 associated with the speech act based on the tagged category. This tag differentiates the phonemes in the catalogue associated with specific speech act required from the phonemes used generally by the system. These phonemes are then communicated to the synthesizer 110 which generates a response containing the proper linguistic variables for the situation. In this way, the dialogue ends in a socially appropriate way.

This same principle applies to various other embodiments of the present system as well. Each speech act has its own linguistic uniqueness compared to normal speech, and the generated speech can be varied to reflect the linguistic differences presented by each. Thus, the DM module may generate different words to be synthesized based on a selected speech act for a prompt.

A different embodiment of the system 100 allows the system to have a manual input selecting the correct phonemes for the speech act. An example of this is if a prompt is generated for the user, and the user does not respond within a certain amount of time, the system will generate the speech act "goodbye". In this embodiment the system 100 is manually set to generate the goodbye in the situation where there is no user response within a set timeframe. There can also be manual settings to implant speech acts at the beginning of every system prompt. For instance, for the second and each successive prompt, the system can be manually set to generate the speech acts of "thank you" followed by "is there anything else we can help you with?". A further example is the system programmed to use the speech act of a filled pause after the system does not understand a user utterance. This example is exemplified by the system generating the speech acts "Hmmm" followed by "I did not understand your question, will you please repeat it?". These are just examples of manually created situations that the system can implement.

A further embodiment of the system 100 can be trained to determine if a speech act is necessary by the context of the dialogue. This can happens regardless of what words the system 100 will eventually use. An example of this is a system, having performed a task for the user, asking if the action taken solved the user's problem. The system prepares, prior to actually completing the task, to produce the forthcoming question. However, the system does not know ahead of time what that problem is, so it cannot know a priori what exact words it will use. The system will know that it needs to ask a yes/no question. Therefore, the system can select the phonemes of a yes/no question and prepare to deliver that question with the appropriate linguistic variables, prior to actually knowing what words are in the question. This embodiment allows the system 100 to discern, by context of the dialogue, what phonemes to make available. This can increase the speed and efficiency of processing data to carry on the dialog. This example also removes the manual element of the system, allowing the system to be trained to determine the appropriate speech act. It is further understood that the two embodiments, trained and manual, can be combined to have a system with set speech act responses and automated speech act responses.

FIG. 3 represents an embodiment of the system 100 that has access to a catalogue 310. The catalogue 310 can be populated with tagged phonemes or tagged phrases. The tagged phrases allow the system to respond with predetermined phrases, rather than building a synthesized phrase from the appropriate phonemes. As shown in FIG. 3, the DM module 106, the SLG module 108 and the synthesizer 110 all have access to the catalogue 310. The catalogue 310, filled with a speech corpus of tagged phrases, allows the system to generate the appropriate speech acts from these phrases. In one embodiment of this system 100, the DM module dictates which part of the speech corpus within the catalogue is available to the SLG module 108 and the synthesizer module 110. Then, the SLG module 108 can deliver the text from the appropriate part of the speech corpus to the synthesizer 110. The synthesizer is thus able to produce the appropriate response consistent with its speech act.

The system, in another embodiment, allows the DM module 106 to tag the instructions communicated to SLG module

108. The SLG module 108 then interprets the tagged instructions into a text processed by the synthesizer module 110. The synthesizer uses the tag to find the appropriate phonemes or phrases within the corpus of speech contained in the catalogue 310. The synthesizer module 310 then uses the appropriate phrases or phonemes to generate the appropriate response for the speech act. Therefore, the three modules, DM, SLG, and synthesizer, may need access to the catalogue 310 because each can be the module used to access the appropriate phrases or phonemes within the catalogue. It is further understood that these examples are merely illustrations of possible embodiments, and those of skill in the art will recognize other ways to use the modules that are still within the purview of the claims.

Figure 4:
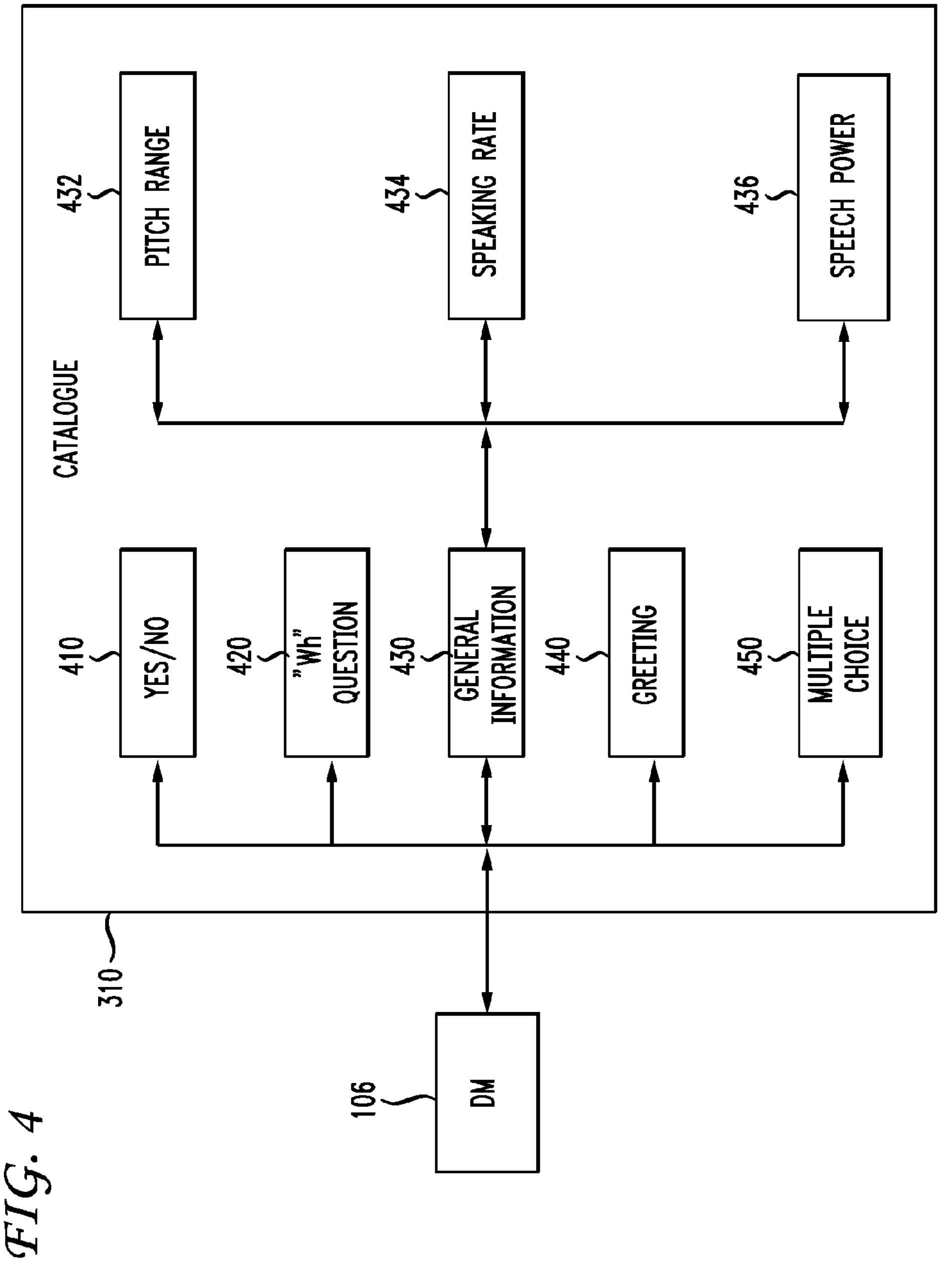
FIG. 4 illustrates a basic example of a catalogue used by the system could use.

FIG. 4 represents one embodiment of the catalogue which demonstrates some of the speech acts available to the system 100 and some of the respective linguistic variables that the system can change depending on the specified speech act. In FIG. 4, the DM module 106 accesses catalogue 310 because a general information speech act is going to be generated by the system 100. When the system 100 generates the general information speech act 430, its linguistic variables are chosen based on how the catalogue is populated. This embodiment of the system is going to produce a synthetic response with the pitch range 432, the speaking rate 434, and the speech power 436 associated with a general information speech act 430 as shown. The DM module 106 then communicates the appropriate linguistic variables to the SLG module 108 which produces the appropriate text that the synthesizer 110 uses to generate the synthesized response.

Figure 5:
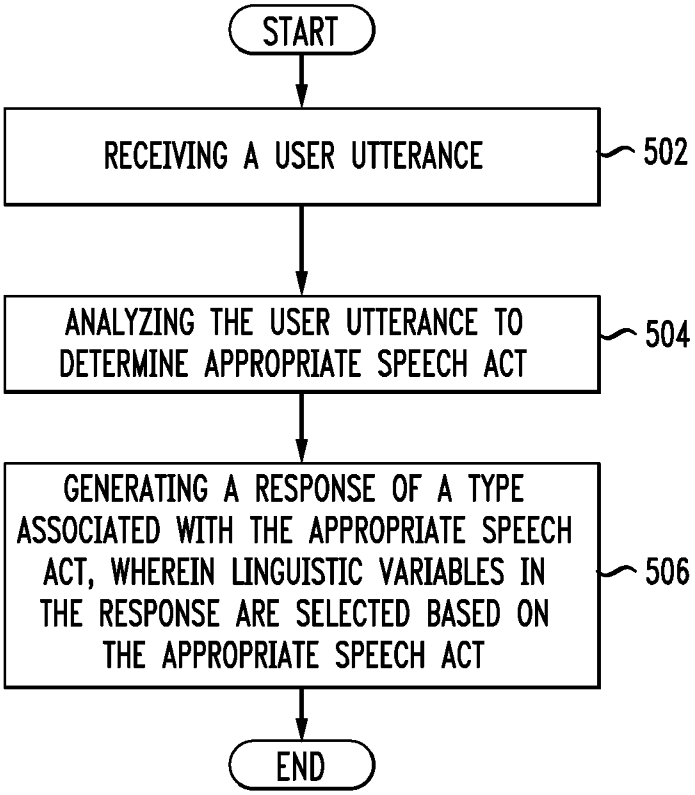
FIG. 5 illustrates a basic method embodiment of the invention.

FIG. 5 illustrates a method embodiment of the invention. The method relates to modifying synthesized speech in a spoken dialog system. As has been noted above, this method relates to utilizing labeled data in a prompt database which may comprise phrases or phonemes. The method may involve receiving text and an identified speech act or acts at a front end. A unit selection process would possibly switch from a standard prompt database to a database prepared with labeled data associated with selecting data based on speech acts. The unit selection process would then select appropriate phonemes or prompts. A backend system would then synthesize the appropriate speech that would be heard by a listener. As shown in FIG. 5, the method includes receiving a user utterance (502), analyzing the user utterance to determine appropriate speech act (504) and generating a response of a type associated with the appropriate speech act, wherein linguistic variables in the response are selected based on the appropriate speech act (506). The linguistic variables may be drawn from a group consisting of verbiage, vocabulary, pronunciation, phrasing, pauses, prosody and pitch. Other characteristics may also be modified as linguistic variables. The generated response is preferably done using text-to-speech (TTS) technology which is generally known in the art. However, other mechanisms for synthesizing speech may also be used.

In another aspect of the invention, the system uses a particular language model that includes labels associated with speech acts. In this aspect, the system analyzes input speech from a user and determines whether particular characteristics of the speech not only may be used to identify the appropriate text as would a standard automatic speech recognition (ASR) module, but also identify particular speech acts associated with the input speech. This data associated with an identified speech act within the user utterance may then be used in other modules in the spoken dialog system to identify an appropriate speech act for the response to be synthesized by the system and the associated text and pitch and prosody and so forth for that response. Thus, the aspects of the present invention may be considered as an additional processing of speech which provides adaptation of the dialog to more appropriately match the speech acts that are used in the dialog as would occur in more natural speech between people.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the system can contain a catalogue with categories of speech acts. Each category can represent a single speech act yet have different phonemes to choose from based on characteristics of the utterance from the user and the specific speech act, rather than only changing linguistic variables based on speech act. Accordingly, the appended claims and their legal equivalents should only define the invention, rather than any specific examples given.

We claim:

1. A method of modifying synthesized speech of a spoken dialogue system, the method comprising:

receiving a user utterance;

analyzing via a processor the user utterance using a natural language understanding model to determine an appropriate speech act for responding to the user utterance;

selecting at least one phoneme from a catalogue of a plurality of phonemes to yield a selected at least one phoneme, wherein the catalogue organizes phonemes based on speech acts, wherein the speech acts used to organize the catalog of a plurality of phonemes are selected from the group of speech acts consisting of: detail information, general information, "wh" questions, yes/no questions, multiple choice questions, greetings, goodbyes, apologies, thanks, requests, directives, repeat, wait, confirmations, disconfirmations, positive exclamations, filled pause, and negative exclamations; and generating a response to the user utterance of a type associated with the appropriate speech act and using the selected at least one phoneme, wherein linguistic variables in the response are selected based on the appropriate speech act.

2. The method of claim 1, wherein the linguistic variables are one or more of verbiage, vocabulary, pronunciation, phrasing, pauses, prosody and pitch.

3. The method of claim 1, wherein the generated response is generated using text-to-speech technology.

4. The method of claim 1, wherein the generating step includes:

accessing a catalogue containing a plurality of phrases;

selecting at least one phrase, from the plurality of phrases, associated with the appropriate speech act; and generating the response based on the selected at least one phrase.

5. A non-transitory computer-readable medium storing instructions for a computing device to function as a spoken dialogue system, the instructions comprising:

receiving a user utterance;

analyzing via a processor the user utterance using a natural language understanding model to determine an appropriate speech act for responding to the user utterance;

selecting at least one phoneme from a catalogue of a plurality of phonemes to yield a selected at least one phoneme, wherein the catalogue organizes phonemes based on speech acts, wherein the speech acts used to organize the catalog of a plurality of phonemes are selected from the group of speech acts consisting of: detail information, general information, "wh" questions, yes/no questions, multiple choice questions, greetings, goodbyes, apologies, thanks, requests, directives, repeat, wait, confirmations, disconfirmations, positive exclamations, filled pause, and negative exclamations; and generating a response to the user utterance of a type associated with the appropriate speech act and using the selected at least one phoneme, wherein linguistic variables in the response are selected based on the appropriate speech act.

6. The non-transitory computer readable medium of claim 5 wherein the instructions provide that linguistic variables be one or more of verbiage, vocabulary, pronunciation, phrasing, pauses, prosody and pitch.

7. The non-transitory computer-readable medium of claim 5, wherein the generated response is generated using text-to-speech technology.

8. The non-transitory computer readable medium of claim 6, wherein the instructions for the generating step includes:

accessing a catalogue containing a plurality of phrases;

selecting at least one phrase, from the plurality of phrases, associated with the appropriate speech act; and generating the response based on the selected at least one phrase.

9. A spoken dialogue system comprising:

a processor;

a first module configured to cause the processor receive a user utterance;

a second module configured to cause the processor analyze the user utterance using a natural language understanding model to determine an appropriate speech act for responding to the user utterance;

a third module configured to select at least one phoneme from a catalogue of a plurality of phonemes to yield a selected at least one phoneme, wherein the catalogue organizes phonemes based on speech acts, wherein the speech acts used to organize the catalog of a plurality of phonemes are selected from the group of speech acts consisting of: detail information, general information, "wh" questions, yes/no questions, multiple choice questions, greetings, goodbyes, apologies, thanks, requests, directives, repeat, wait, confirmations, disconfirmations, positive exclamations, filled pause, and negative exclamations; and a fourth module configured to cause the processor generate a response to the user utterance of a type associated with the appropriate speech act and using the selected at least one phoneme, wherein linguistic variables in the response are selected based on the appropriate speech act.

10. The system of claim 9 wherein the linguistic variables are one or more of verbiage, vocabulary, pronunciation, phrasing, pauses, prosody and pitch.

11. The system of claim 9, wherein the fourth module is configured to cause the processor to generate the response using text-to-speech technology.

12. The system of claim 9, wherein the fourth module is configured to include:

a fifth module configured to cause the processor to select at least one phrases from a catalogue of a plurality of phrases, which catalogue organizes phonemes based on associated speech acts; and a sixth module configured to cause the processor to generate the response based on the selected at least one phrase.

* * * * *